US011148511B2

(12) United States Patent
Plentis et al.

(10) Patent No.: US 11,148,511 B2
(45) Date of Patent: Oct. 19, 2021

(54) VEHICLE DOOR ASSEMBLY

(71) Applicants: MAGNA INTERNATIONAL INC., Aurora (CA); David N. Plentis, Rochester Hills, MI (US); Darren A. Womack, Windsor (CA); Warren E. Young, Troy, MI (US)

(72) Inventors: David N. Plentis, Rochester Hills, MI (US); Darren A. Womack, Windsor (CA); Warren E. Young, Troy, MI (US)

(73) Assignee: MAGNA INTERNATIONAL INC., Aurora (CA)

(*) Notice: Subject to any disclaimer, the term of this patent is extended or adjusted under 35 U.S.C. 154(b) by 420 days.

(21) Appl. No.: 15/746,960

(22) PCT Filed: Jul. 22, 2016

(86) PCT No.: PCT/US2016/043705
§ 371 (c)(1),
(2) Date: Jan. 23, 2018

(87) PCT Pub. No.: WO2017/015620
PCT Pub. Date: Jan. 26, 2017

(65) Prior Publication Data
US 2020/0079191 A1    Mar. 12, 2020

Related U.S. Application Data

(60) Provisional application No. 62/195,818, filed on Jul. 23, 2015.

(51) Int. Cl.
*B60J 5/04* (2006.01)
(52) U.S. Cl.
CPC ........... *B60J 5/0416* (2013.01); *B60J 5/0405* (2013.01); *B60J 5/0411* (2013.01); *B60J 5/0429* (2013.01)

(58) Field of Classification Search
CPC ....... B60J 5/0405; B60J 5/0413; B60J 5/0416
See application file for complete search history.

(56) References Cited

U.S. PATENT DOCUMENTS 4,416,088 A * 11/1983 Feucht ............... B60J 5/0463
49/502
4,800,638 A    1/1989 Herringshaw et al.
(Continued)

FOREIGN PATENT DOCUMENTS

CN    1867471 A    11/2006
CN   101405159 A    4/2009
(Continued)

OTHER PUBLICATIONS

European Search Report issued in co-pending Appln. No. EP15828655.7, dated Feb. 1, 2019.
(Continued)

*Primary Examiner* — Catherine A Kelly
(74) *Attorney, Agent, or Firm* — Dickinson Wright PLLC

(57) ABSTRACT

The vehicle door assembly includes an outer panel which has a rocker sill area and a beltline area. A reinforcement member, which is made of one or more pieces, is attached with the outer panel along at least a portion of an outer periphery of the outer panel. The door assembly further includes a module which is made as a single integral piece and is fixedly attached with the reinforcement member. The module has an inner beltline reinforcement and supports a pair of window channels and a window regulator for controllably raising and lowering a window between an open position and a closed position.

6 Claims, 7 Drawing Sheets

(56) References Cited

U.S. PATENT DOCUMENTS

| | | | | |
|---|---|---|---|---|
| 5,857,732 | A * | 1/1999 | Ritchie | B60J 5/0416 296/146.11 |
| 5,906,072 | A | 5/1999 | Feige et al. | |
| 5,964,063 | A * | 10/1999 | Hisano | B60J 1/17 49/352 |
| 6,139,088 | A * | 10/2000 | Okamoto | B60J 5/0416 296/146.1 |
| 6,176,542 | B1 | 1/2001 | Gooding et al. | |
| 6,231,112 | B1 * | 5/2001 | Fukumoto | B60J 5/0412 296/146.5 |
| 6,301,835 | B1 * | 10/2001 | Pfeiffer | B60J 5/0416 296/146.5 |
| 6,449,907 | B2 | 9/2002 | Nishikawa et al. | |
| 6,536,164 | B1 | 3/2003 | Kirejczyk | |
| 7,231,717 | B2 * | 6/2007 | Wurm | B60J 5/0405 29/458 |
| 7,380,865 | B2 * | 6/2008 | Eckhardt | B29C 45/14 296/146.2 |
| 7,581,779 | B2 * | 9/2009 | Baumgart | B60J 5/0416 296/146.5 |
| 7,712,809 | B2 * | 5/2010 | Lynam | B60J 5/0404 248/475.1 |
| 7,766,414 | B2 * | 8/2010 | Krajewski | B60J 5/0405 296/146.5 |
| 7,815,243 | B2 * | 10/2010 | Salzmann | B60J 5/0416 296/146.7 |
| 9,126,470 | B2 * | 9/2015 | Kaliomaki | B60J 5/0416 |
| 2001/0038228 | A1 | 11/2001 | Morrison et al. | |
| 2007/0125003 | A1 * | 6/2007 | Wartzack | B60J 5/0463 49/502 |
| 2009/0008959 | A1 * | 1/2009 | Rehn | B60J 5/0405 296/146.7 |
| 2010/0229470 | A1 * | 9/2010 | Wikstrom | B60J 5/0405 49/394 |
| 2014/0110964 | A1 | 4/2014 | Schijve et al. | |
| 2019/0184796 | A1 * | 6/2019 | Jeon | B60J 5/0413 |

FOREIGN PATENT DOCUMENTS

| | | | |
|---|---|---|---|
| DE | 102011011828 A1 * | 8/2012 | ............ B60J 5/0415 |
| WO | 98/16709 A1 | 4/1998 | |
| WO | 9816709 A1 | 4/1998 | |
| WO | 2008/097152 A1 | 8/2008 | |
| WO | 2008097152 A1 | 8/2008 | |

OTHER PUBLICATIONS

CN Office Action, issued in co-pending CN Appln. No. 201680043000.4, dated Jun. 12, 2020.

EP Official Communication, issued in co-pending EP Appln. No. 16 828 655.7, dated Sep. 16, 2020.

* cited by examiner

VEHICLE DOOR ASSEMBLY

CROSS REFERENCE TO RELATED APPLICATIONS

This U.S. National Stage Patent Application claims the benefit of PCT Patent International Application Serial No. PCT/US2016/043705 filed Jul. 22, 2016 entitled "Vehicle Door Assembly" which claims the benefit of U.S. Provisional Patent Application Ser. No. 62/195,818 filed on Jul. 23, 2015 entitled "Vehicle Door Assembly," the entire disclosures of the applications being considered part of the disclosure of this application and hereby incorporated by reference.

BACKGROUND OF THE INVENTION

1. Field of the Invention

The present invention is related generally to vehicle doors.

2. Related Art

Typical door assemblies include a large number of structural components which are all formed separately and are connected with one another during final assembly of the vehicle. For example, a typical door assembly includes a side impact beam, an outer panel, an outer beltline reinforcement, an inner panel, an inner beltline reinforcement, a module, a window frame, a window regulator, a pane of glass, etc. In many cases, during final assembly of the vehicle, the outer and inner panels are connected with one another before painting. Then, after painting is completed, a module with a window regulator and a pair of window channels is inserted into a space between the inner and outer panels through an opening in the inner panel. A window pane is then lowered through a gap between the inner and outer beltline reinforcements into the window channels.

There is a continuing need for an improved door assembly which can be manufactured more efficiently, which requires less resources during final assembly of the vehicle and which has less mass than other known door assemblies.

SUMMARY OF THE INVENTION AND ADVANTAGES

One aspect of the present invention is related to an improved door assembly for a vehicle. The door assembly includes an outer panel that has a rocker sill area, a beltline area and an styled outer surface. A reinforcement member, which is made of one or more pieces, is attached with the outer panel around at least a portion of an outer periphery of the outer panel. The door assembly further includes a module that is made as a single integral piece and is fixedly attached with the reinforcement member. The module has an inner beltline reinforcement and supports a pair of window channels and a window regulator for controllably raising and lowering a window between an open position and a closed position.

The module is configured such that it may be pre-assembled with door hardware, such as the window channels, the window regulator, and the window before the module is attached with the outer panel or the reinforcement member. Attaching the window with the module before to attaching the module with the outer panel and the reinforcement member allows for quicker, more efficient assembly of the vehicle by eliminating the step of inserting the window between an inner panel and an outer panel. Additionally, making the module as one piece reduces the total mass of the door assembly by eliminating the fasteners that typically connect the module with an inner panel.

According to another aspect of the present invention, the one-piece module further includes a window frame which extends through a closed shape around an opening for receiving the window when the window is in the closed position.

According to yet another aspect of the present invention, the one-piece module is made of a non-metallic material.

According to still another aspect of the present invention, the non-metallic material of the one-piece module is a carbon fiber reinforced polymer.

According to a further aspect of the present invention, the outer panel and the reinforcement member are both made of metal.

According to yet a further aspect of the present invention, a primary seal is attached with the module and extends through a closed loop for sealing the door assembly with a vehicle body.

According to still a further aspect of the present invention, at least one trim piece is joined with the module and at least partially covers a face of the module opposite of the outer panel.

According to another aspect of the present invention, the door assembly further includes a side impact beam which is attached with the reinforcement member.

According to yet another aspect of the present invention, the reinforcement member is attached with the outer panel along at least a portion of the outer periphery.

According to still another aspect of the present invention, the reinforcement member is made as one integral piece.

Another aspect of the present invention is related to a method of making a vehicle door. The method includes the step of preparing an outer panel and a reinforcement member that has an outer beltline reinforcement. The method proceeds with the step of fixedly attaching a pair of window channels and a window regulator with a one-piece module. The method continues with the step of inserting a window into the window channels and operatively connecting the window regulator with the window. The method proceeds with the step of fixedly attaching the module with the outer panel and the reinforcement member only after the window channels and the regulator have been fixedly attached with the module and only after the window has been inserted into the window channels and operatively connected with the window regulator.

According to another aspect of the present invention, the method further includes the step of stamping the outer panel from a single sheet of metal.

According to yet another aspect of the present invention, the method further includes the step of die casting the reinforcement member.

According to still another aspect of the present invention, the method further includes the step of compression molding the module out of a carbon fiber reinforced polymer.

According to a further aspect of the present invention, the method further includes the step of fixedly attaching the reinforcement member with the outer panel.

According to yet a further aspect of the present invention, the method further includes the step of fixedly attaching a side impact beam with the reinforcement member.

According to still a further aspect of the present invention, the method further includes the step of attaching a primary seal with the module for sealing the door assembly with a body of the vehicle.

According to another aspect of the present invention, the method further includes the step of fixedly attaching at least one trim piece with a face of the module opposite of the outer panel.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENT

Figure 1:
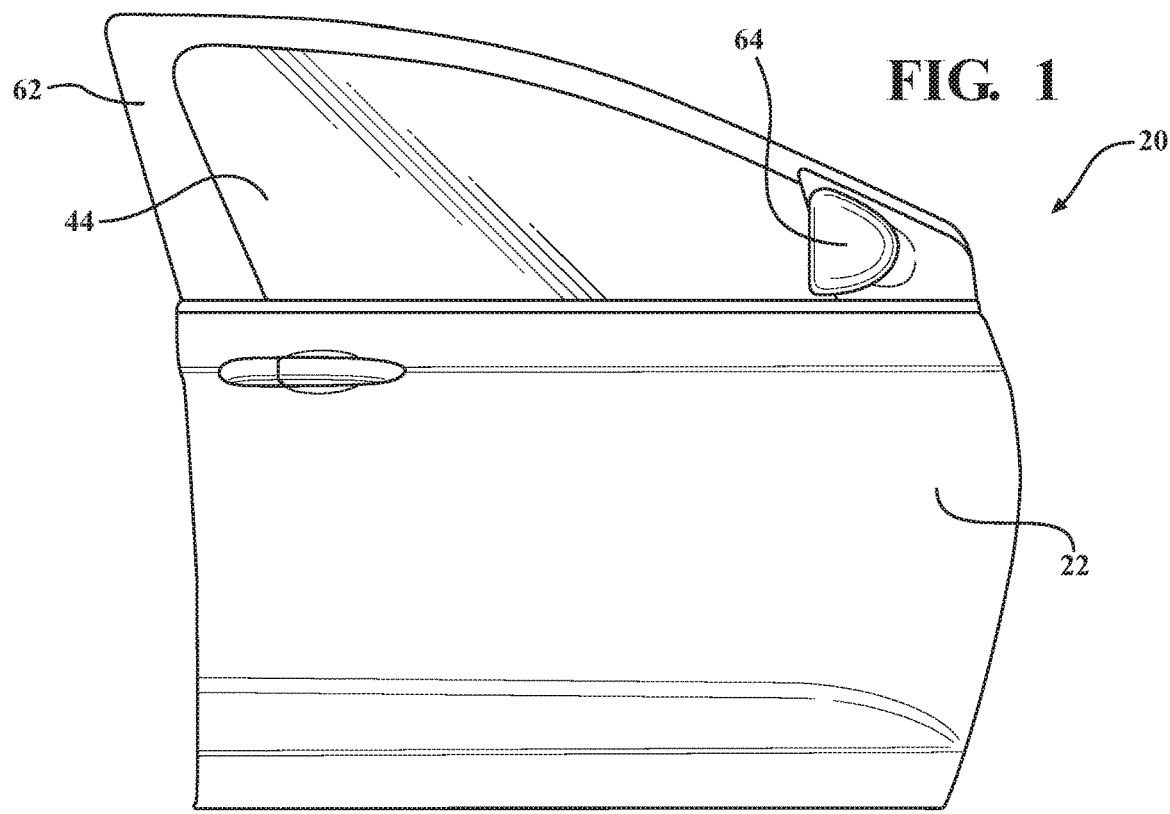
FIG. 1 is a front elevation view of an exemplary embodiment of a door assembly.
Figure 2:
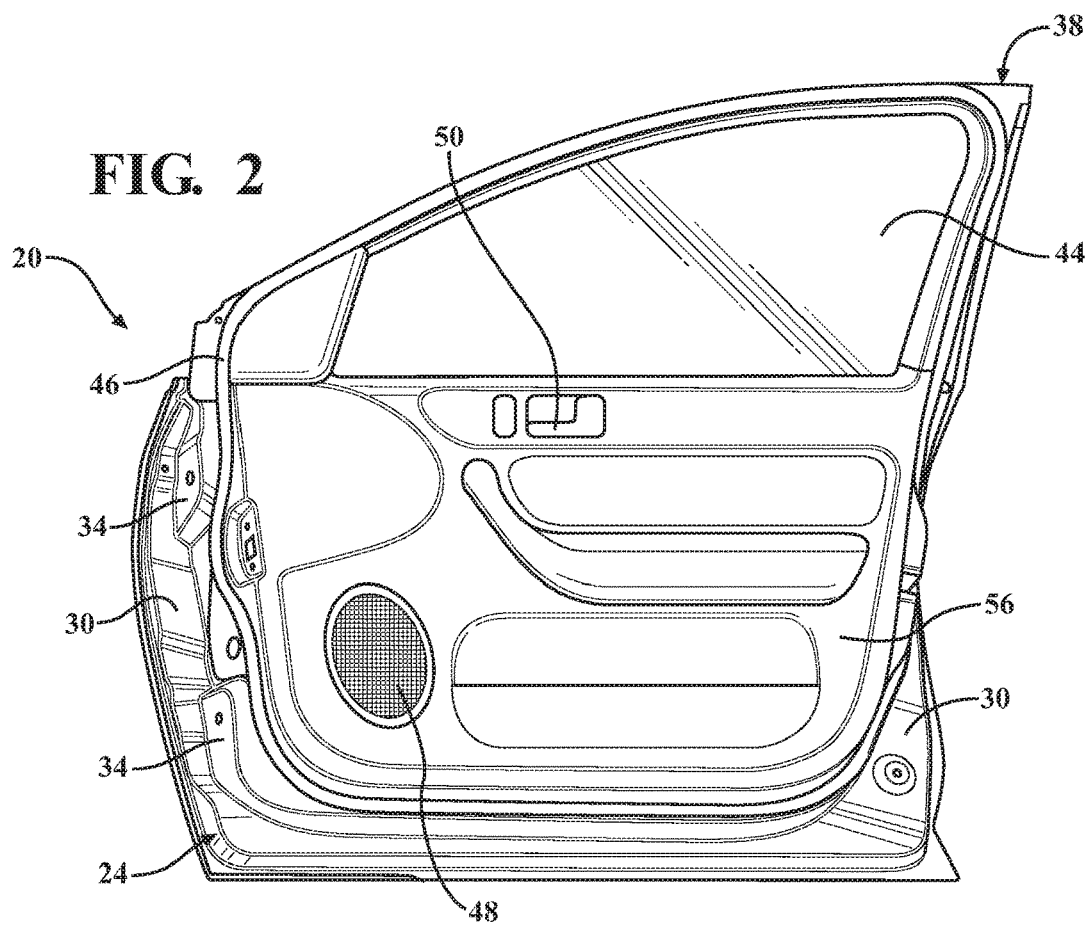
FIG. 2 is a back elevation view of the door assembly of FIG. 1.
Figure 3:
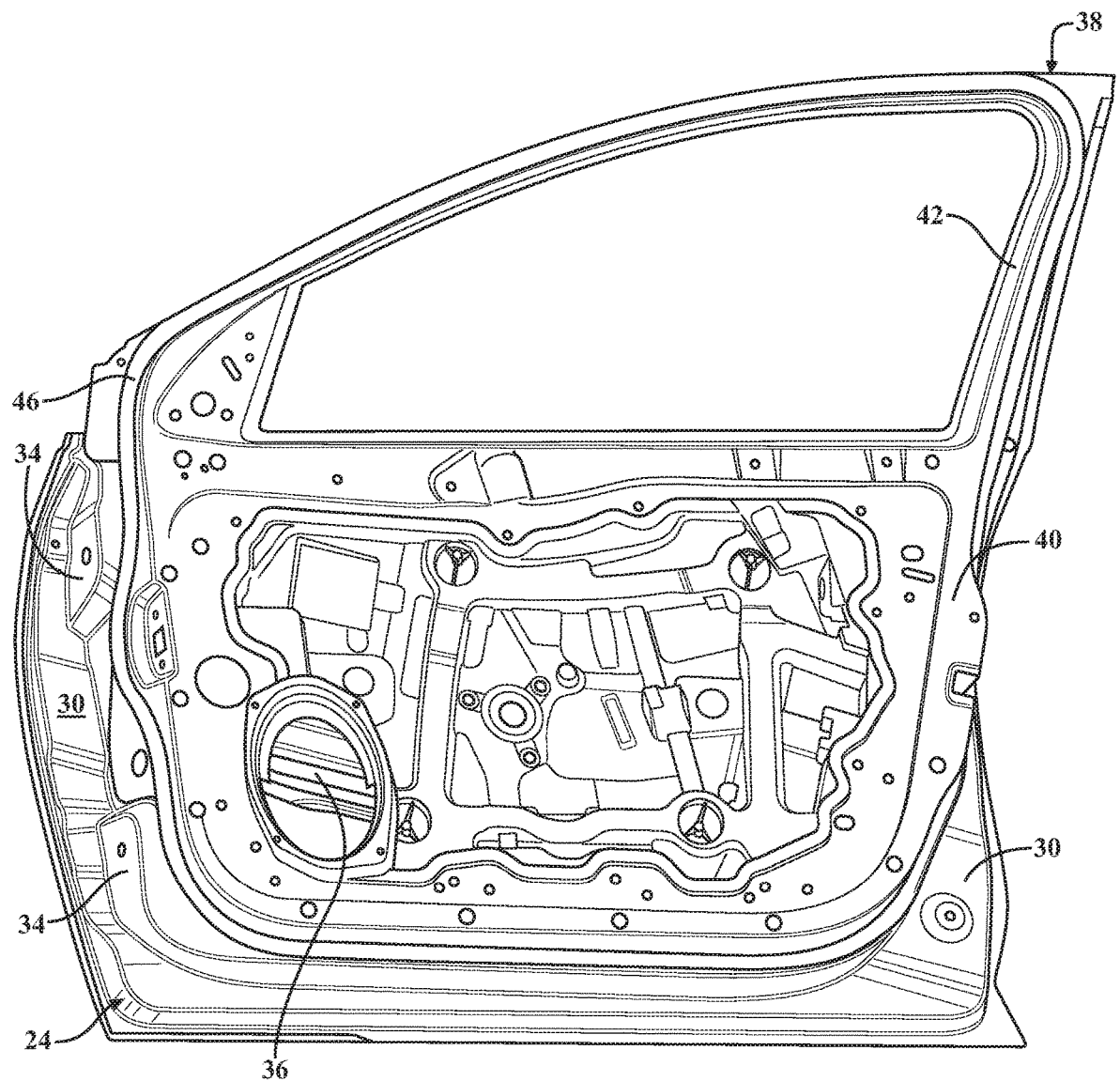
FIG. 3 is a back elevation view of the door assembly of FIG. 1 with a trim piece removed.

Referring to the Figures, wherein like numerals indicate corresponding parts throughout the several views, an exemplary embodiment of an improved vehicle door assembly 20 is generally shown in FIGS. 1-3. In the exemplary embodiment, the door assembly 20 is a front, passenger door of a car. However, it should be appreciated that the door assembly 20 may be configured for either side and for either the front or the back of the vehicle. The door assembly 20 may also be configured for use in any suitable type of vehicle including, for example, a pickup truck, a sport utility vehicle, etc.

Figure 4:
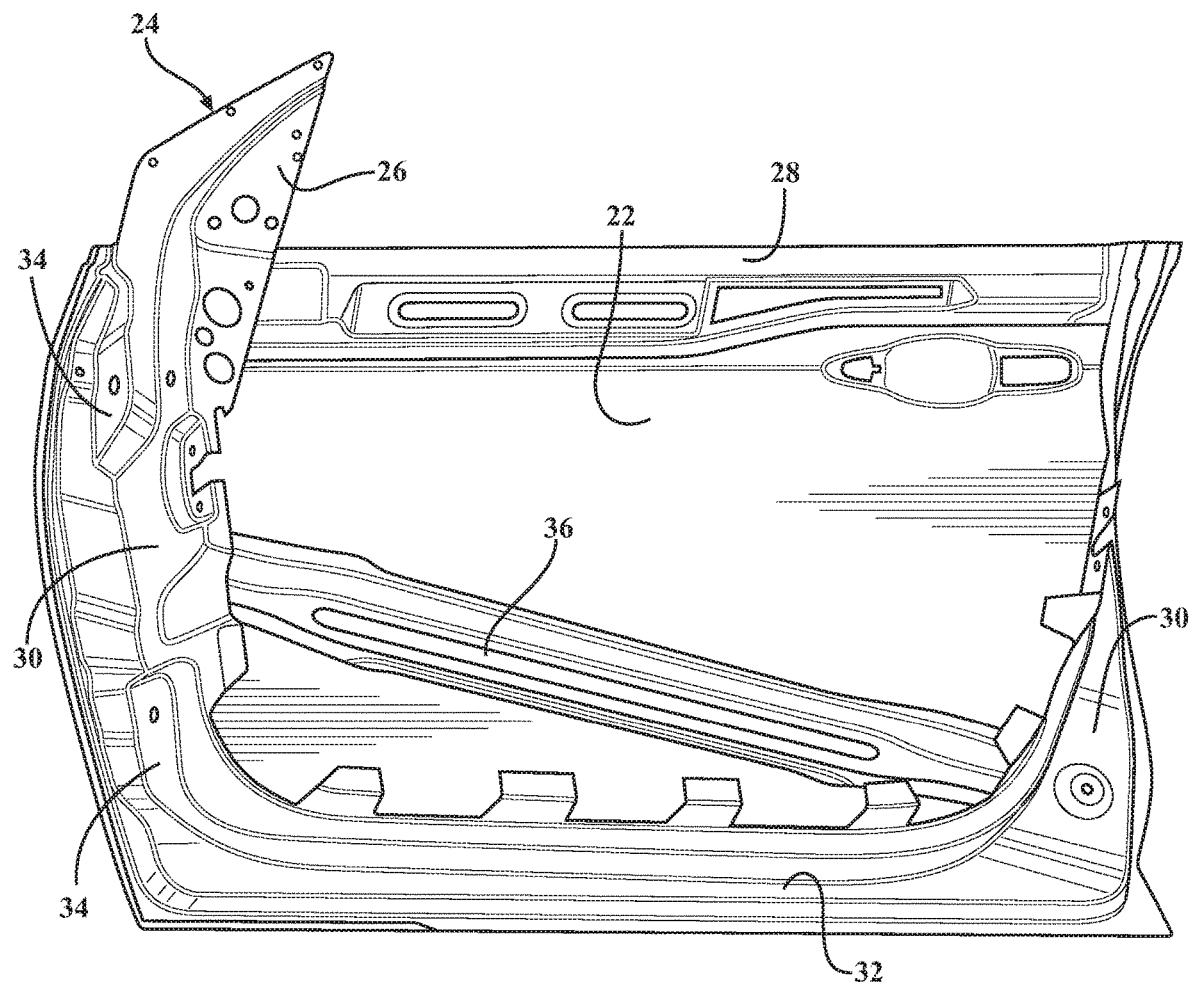
FIG. 4 is a perspective view of an outer panel and a door ring and a side impact beam of the door assembly of FIG. 1.

Referring now to FIG. 4, the door assembly 20 includes a generally rectangularly shaped outer panel 22 with a painted outer styled surface (shown in FIG. 1) and a reinforcement member or inner panel (hereinafter referred to as a "door ring 24") which is attached with an inner surface of the outer panel 22 to structurally reinforce the outer panel 22. The outer panel 22 is preferably stamped to its final or near-final shape from a single sheet of aluminum or an aluminum alloy. However, any suitable material may be employed including, for example, magnesium, a magnesium alloy, steel or an alloy steel. The outer panel 22 extends in a vertical direction from a beltline area to a lower sill area and in a longitudinal (forward/backward) direction from a front to a back.

The door ring 24 is made as one or more pieces and has a generally rectangularly shaped outer periphery that generally matches an outer periphery of the outer panel 22 but further includes a sideview mirror mount 26. In this embodiment, the door ring 24 is made as multiple pieces which are individually stamped to their respective shapes and are then joined together. The door ring 24 and outer panel 22 are attached with one another along at least a portion of their respective outer peripheries. The exemplary embodiment of the door ring 24 has an outer beltline reinforcement 28, a pair of side portions 30 and a lower portion 32 which surround an opening. One of the side portions 30 includes a pair of generally flat hinge mounts 34 for receiving door hinges (not shown). The door ring 24 may be attached with the outer panel 22 through any suitable attachment means or combination of attachment means including, for example, mechanical fasteners (such as rivets or bolts), welding, brazing, material deformation, a single shear joint, a double shear joint, coach joints, resistance spot welding, gas metal arc welding, gas tungsten arc welding, laser welding, etc. For example, in the exemplary embodiment, the side portions 30 and the outer beltline reinforcement 28 are attached with the outer panel 22 via a plurality of fasteners (such as rivets or bolts), and the outer panel 22 is deformed to wrap around an area of the lower portion 32 of the door ring 24. The door ring 24 is preferably made of aluminum or an aluminum alloy. However, any suitable material may be employed.

A side impact beam 36 is attached with and extends between the side portions 30 of the door ring 24 for strengthening the door assembly 20 to resist deformation and collapse in the event of a side impact collision. The side impact beam 36 is preferably made of steel or a steel alloy but any suitable material may be employed. The side impact beam 36 may have any suitable shape or configuration for reinforcing the outer panel 22 and the door ring 24.

Figure 5:
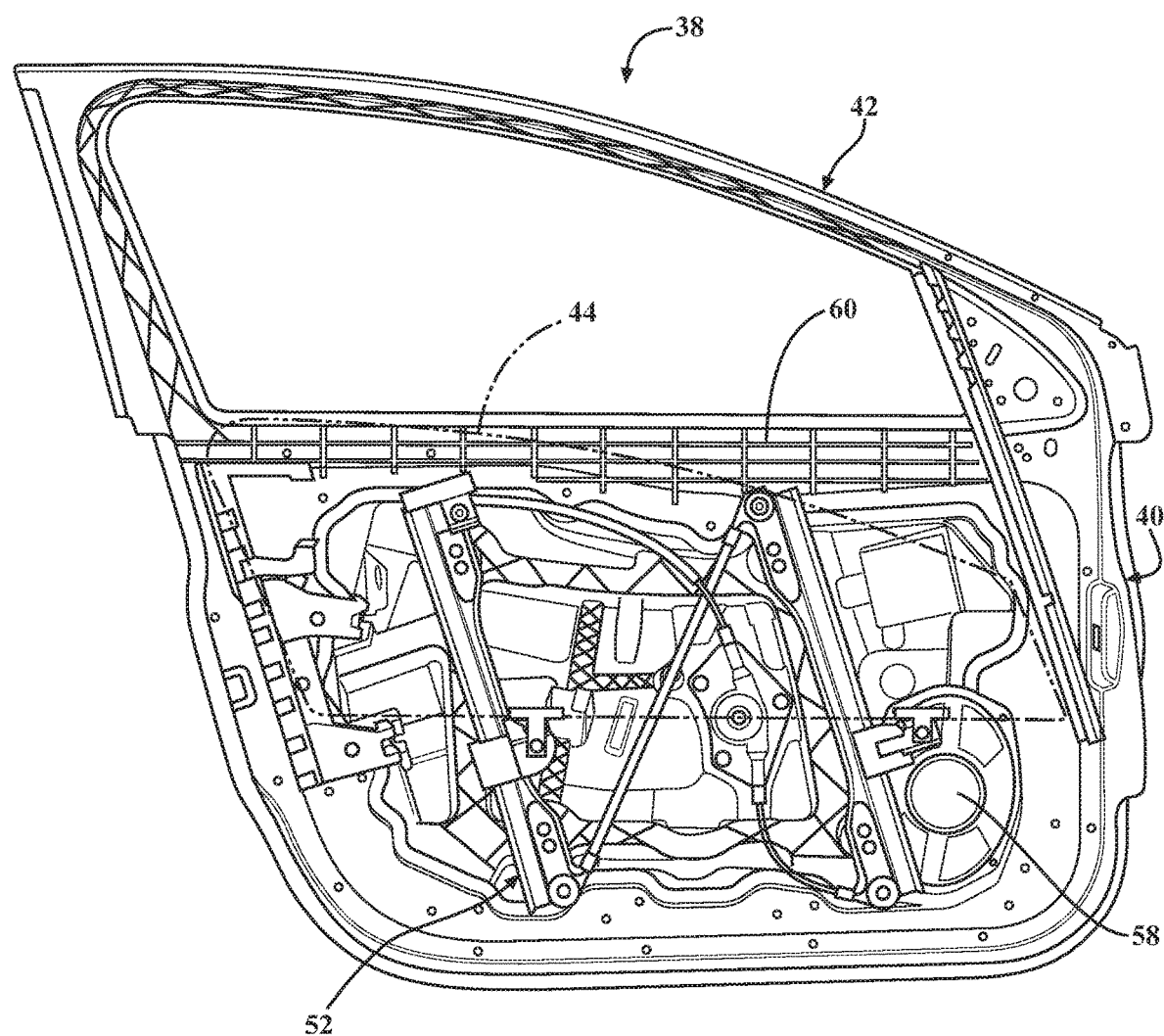
FIG. 5 is a front elevation view of a module of the door assembly of FIG. 1.
Figure 6:
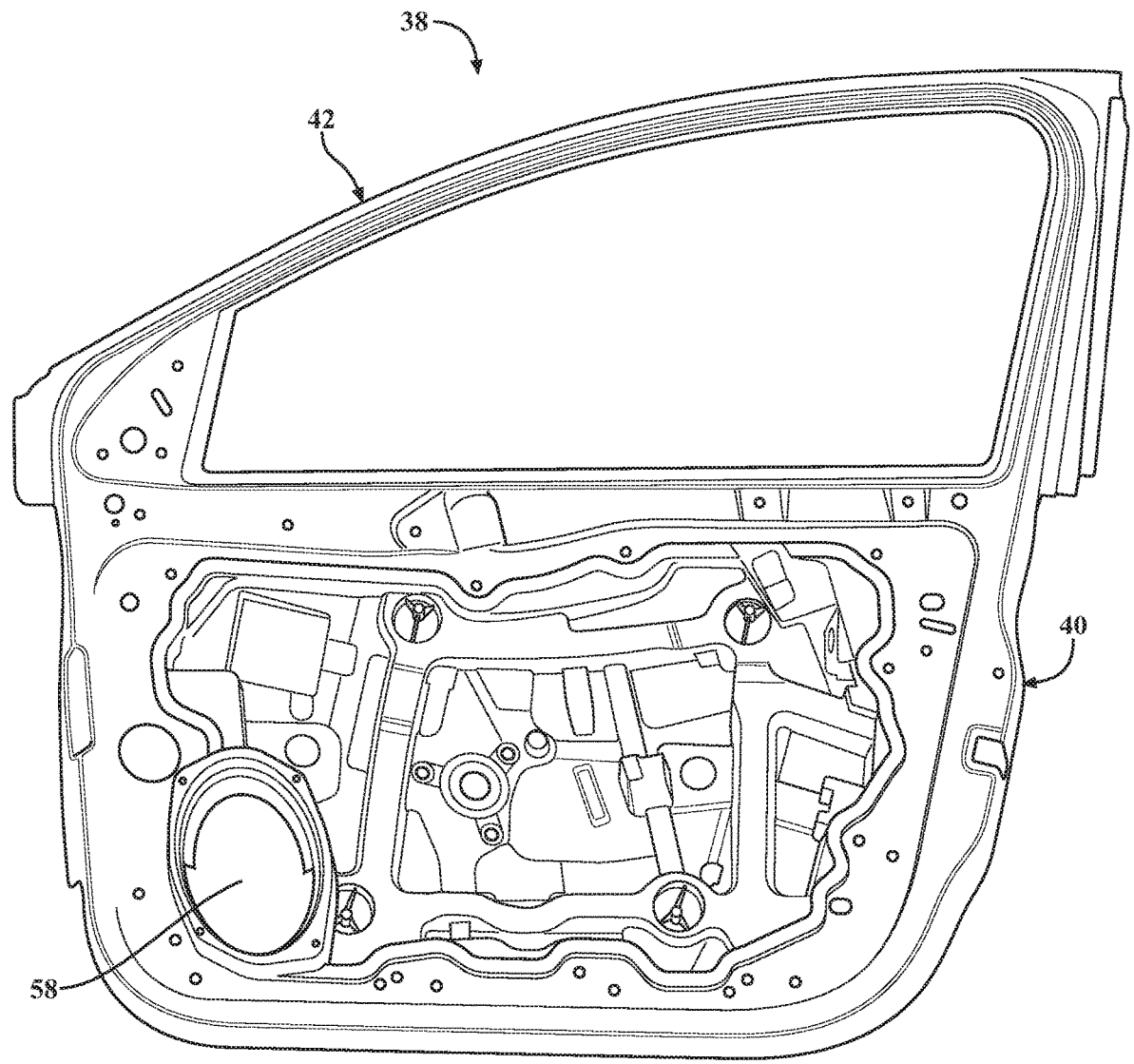
FIG. 6 is a back elevation view of the module of FIG. 5.
Figure 7:
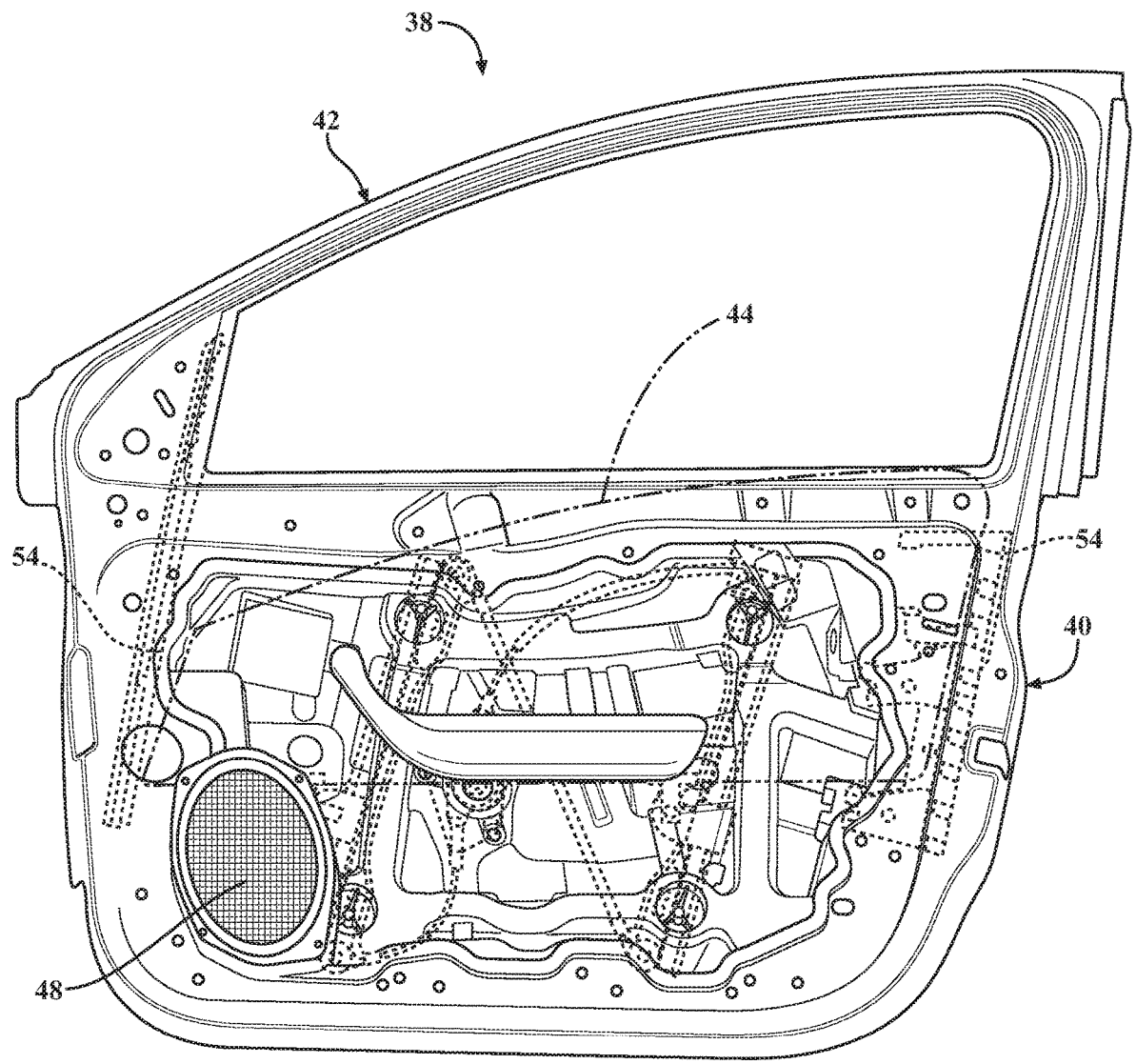
FIG. 7 is a back elevation view of the module of FIG. 5 pre-assembled with door hardware and a window.

Referring now to FIGS. 3, 5 and 6, the door assembly 20 further includes an inner carrier (hereinafter referred to as a module 38) which is fixedly attached with the door ring 24 via a plurality of fasteners, such as rivets or bolts. The module 38 is made as one integral piece of material and presents a door portion 40 and a generally triangularly shaped window frame 42. The door portion 40 of the module 38 substantially covers the opening of the door ring 24, and the window frame 42 extends vertically upwardly from a top end of the door portion 40. The window frame 42 has an opening for supporting a pane of glass, or a window 44 (shown in FIGS. 1 and 2) when the window 44 is in a closed position. In the exemplary embodiment, a portion of the window frame 42 is provided with a lattice-shaped structure of ribs for strengthening the window frame 42.

A primary seal 46 is attached with the module 38 for establishing a fluid tight seal between the door assembly 20 and a body (not shown) of the vehicle. In the exemplary embodiment, the primary seal 46 extends through a closed shape around both the door portion 40 and the window frame 42, but it should be appreciated that the primary seal 46 could take any suitable shape depending on the geometry of the door assembly 20. The primary seal 46 is preferably attached with the module 38 via a plurality of fasteners that are spaced from one another along the primary seal 46. The primary seal 46 is preferably made of an elastic material, such as rubber, but any suitable material may be employed.

The module 38 supports much of the door hardware including, inter alia, switches (not shown); sensors (not shown); a speaker 48; an inner handle mechanism 50; a window regulator 52; a pair of window channels 54; weather stripping (not shown) for sealing the module 38 with the window 44; one or more trim pieces 56; and one or more wiring harnesses (not shown). The speaker 48 is disposed in a speaker opening 58 on the module 38. The window regulator 52 includes an electric motor and a pulley system which is configured to controllably raise the window 44 to a closed position and lower the window 44 to an open position. The window channels 54 are disposed in spaced and parallel relationship with one another and function to support and guide this movement between the open and closed positions. When it is in the open position, the window 44 is disposed in a gap between the door ring 24 and the module 38. The door hardware may be fixedly attached with the module 38 through any suitable means or combination of means including, for example, fasteners, adhesives, brazing, material deformation, etc.

The module 38 is made as one integral piece of a single, lightweight material and also includes an inner beltline reinforcement 60 which is aligned with the outer beltline reinforcement 28 of the door ring 24. In the exemplary embodiment, the inner beltline reinforcement 60 includes a plurality of ribs that extend along a portion of the length of the module 38 for strengthening the module 38 adjacent to the window frame 42. Preferably, the module 38 is made of a carbon fiber reinforced polymer (CFRP) material which is shaped to its final or near final shape through a compression molding operation. CFRP has been found to provide exceptional strength and mass savings advantages. However, other lightweight materials, such as magnesium or a magnesium alloy, may be employed.

The unique construction of the module 38 allows it to be pre-assembled with the door hardware and with the window 44 before the module 38 is attached the door ring 24. The module 38 with the pre-attached hardware may then be joined with the door ring 24 and the outer panel 22 after the outer panel 22 has gone through painting with the remainder of the vehicle's exterior surface. This provides for manufacturing cost savings by eliminating the common step of inserting the window between inner and outer door panels as is typically required during final assembly of the vehicle. Additionally, a door manufacturer may pre-assembly the module 38 with at least some of the door hardware before sending the module 38 to a final assembly plant for the vehicle, thereby saving valuable space and resources in the final assembly plant and allowing an assembly line for the vehicle to operate more quickly by reducing the time required to assemble each vehicle. The inner trim pieces 56 and one or more outer trim pieces 62 and a sideview mirror 64 may also be added to the module 38 either before or after the module 38 is fixedly attached with the outer panel 22 and the door ring 24.

Figure 8:
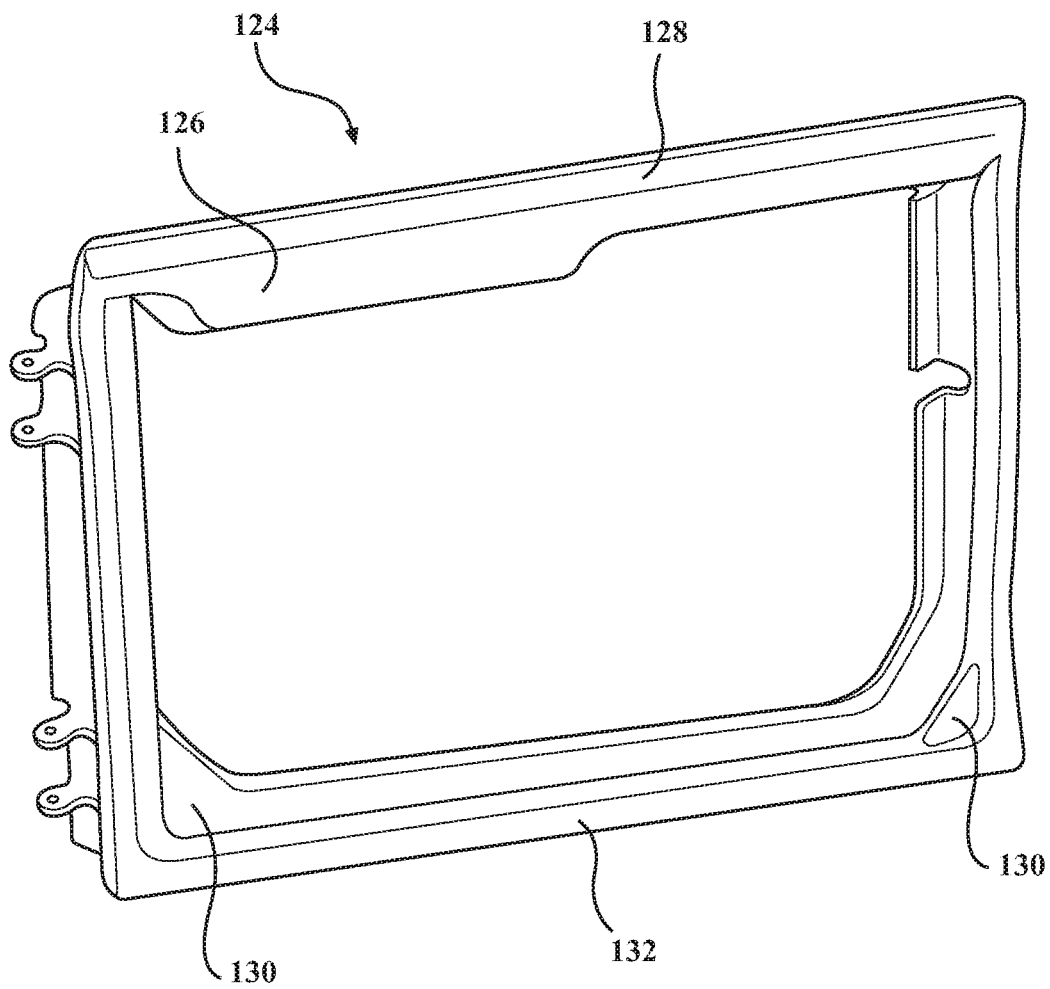
FIG. 8 is an alternate embodiment of the door ring.

An alternate embodiment of the door ring 124 is generally shown in FIG. 8 with like numerals, separated by a prefix of "1", indicating corresponding parts with the embodiment described above. The door ring 124 of this embodiment is differentiated from the above-described embodiments because it is constructed as one integral piece which is shaped to final or near final form through die casting.

Another aspect of the present invention is a method of making a vehicle. The method includes the step of stamping an outer panel 22 from a single sheet of material, such as aluminum. The method proceeds with the step of die casting a door ring 24 with an outer beltline reinforcement 28 with a metal, such as aluminum. The method continues with the step of fixedly attaching the door ring 24 to the outer panel 22. The method proceeds with the step of attaching the outer panel 22 and the door ring 24 with a portion of a vehicle. The method continues with the step of painting the vehicle including an outer surface of the outer panel 22. The method proceeds with the step of compression molding a one-piece module 38 out of a CFRP. The method continues with the step of fixedly attaching a pair of window channels 54 and a window regulator 52 with the one-piece module 38. The method proceeds with the step of inserting a window 44 into the window channels 54 and operatively connecting the window regulator 52 with the window 44. The method continues with the step of fixedly attaching the one-piece module 38 with the outer panel 22 and the door ring 24 only after the window channels 54 and window regulator 52 have been fixedly attached with the module 38 and only after the window 44 has been inserted into the window channels 54 and is operatively connected with the window regulator 52.

Obviously, many modifications and variations of the present invention are possible in light of the above teachings and may be practiced otherwise than as specifically described while within the scope of the appended claims.

What is claimed is:

1. A door assembly for a vehicle, comprising:
    an outer panel made of metal;
    said outer panel having a rocker sill area and a beltline area presenting a portion of an outer periphery of said outer panel, and said outer panel including a styled outer surface;
    a reinforcement member separate from said outer panel and made as at least one piece of metal, said reinforcement member having an outer periphery which extends along said outer periphery of said outer panel, said reinforcement member including a beltline reinforcement, side portions, and a lower portion surrounding an opening; said side portions and said lower portion of said reinforcement extending from said opening and away from said outer panel, and said beltline reinforcement of said reinforcement member being attached to said outer panel along said beltline area of said outer panel;
    a module made as a single integral piece of non-metallic material, said module covering said opening of said reinforcement member, a portion of an outer periphery of said module being surrounded by said side portions and said lower portion of said reinforcement member which extend away from said outer panel, and said module being fixedly attached to said reinforcement member;
    a window disposed between said reinforcement member and said module; and
    said module including an inner beltline reinforcement disposed adjacent said beltline reinforcement of said reinforcement member, and said module including a window frame providing a closed shape around an opening, and said module capable of supporting a pair of window channels and a window regulator for controllably raising and lowering said window between an open position and said closed position.

2. The door assembly as set forth in claim 1 wherein said non-metallic material of said one-piece module is a carbon fiber reinforced polymer.

3. The door assembly as set forth in claim 1 further including a primary seal attached with said module and extending through a closed loop for sealing said door assembly against a body of the vehicle.

4. The door assembly as set forth in claim 1 further including at least one trim piece joined with said module and at least partially covering a face of said module opposite of said outer panel.

5. The door assembly as set forth in claim 1 further including a side impact beam attached with said reinforcement member.

6. The door assembly as set forth in claim 1 wherein said reinforcement member is made as one integral piece.

* * * * *